(12) United States Patent
Leng et al.

(10) Patent No.: US 10,546,604 B1
(45) Date of Patent: Jan. 28, 2020

(54) ADAPTIVE CONTAMINATION CLEANING PROCESS

(71) Applicant: Seagate Technology LLC, Cupertino, CA (US)

(72) Inventors: QingFang Leng, Eden Prairie, MN (US); Ling Sun, Maple Grove, MN (US); Ming Chen, Eden Prairie, MN (US); Mark Andrew Buzek, Bloomington, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 16/149,498

(22) Filed: Oct. 2, 2018

(51) Int. Cl.
   *G11B 5/41* (2006.01)
   *G11B 5/60* (2006.01)
   *G11B 5/40* (2006.01)

(52) U.S. Cl.
   CPC ............... *G11B 5/41* (2013.01); *G11B 5/40* (2013.01); *G11B 5/607* (2013.01)

(58) Field of Classification Search
   CPC .............. G11B 5/40; G11B 5/41; G11B 5/607
   USPC ........................................................ 360/128
   See application file for complete search history.

(56) References Cited

U.S. PATENT DOCUMENTS

| 6,291,796 B1 * | 9/2001 | Lu ..................... B08B 7/0042 219/121.68 |
| 2003/0202273 A1 * | 10/2003 | Smith ..................... G11B 5/41 360/69 |
| 2015/0085632 A1 | 3/2015 | Kiely et al. |

* cited by examiner

*Primary Examiner* — Allen T Cao
(74) *Attorney, Agent, or Firm* — Mueting, Raasch & Gebhardt, P.A.

(57) ABSTRACT

A method includes performing a cleaning process. The cleaning process includes measuring a thickness value of a contaminant on a slider. It is determined whether the thickness value is greater than a target thickness. If it is determined that the thickness is greater than the target thickness, the slider is cleaned based on the measured thickness value. The cleaning process is iteratively repeated until the thickness value is less than or equal to the target thickness.

20 Claims, 12 Drawing Sheets

ADAPTIVE CONTAMINATION CLEANING PROCESS

SUMMARY

Embodiments disclosed herein involve a method comprising performing a cleaning process. The cleaning process comprises measuring a thickness value of a contaminant on a slider. It is determined whether the thickness value is greater than a target thickness. If it is determined that the thickness is greater than the target thickness, the slider is cleaned based on the measured thickness value. The cleaning process is iteratively repeated until the thickness value is less than or equal to the target thickness.

Embodiments described herein are directed to an apparatus comprising a slider of a magnetic recording disk drive movable relative to a magnetic recording medium. A controller of the disk drive is coupled to the slider. The controller is configured to perform a cleaning process. A thickness value of a contaminant on the slider is measured. It is determined whether the thickness value is greater than a target thickness. If it is determined that the thickness is greater than the target thickness, a cleaning process is initiated based on the measured thickness value. The cleaning process is iteratively repeated until the thickness value is less than or equal to the target thickness.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification, reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure is generally directed to read-write heads used in magnetic recording devices such as hard drives. In particular, this disclosure relates to heat-assisted magnetic recording (HAMR), which can be used to increase areal data density of magnetic media. In a HAMR device, information bits are recorded in a storage layer at elevated temperatures in a specially configured magnetic media. The use of heat can overcome superparamagnetic effects that might otherwise limit the areal data density of the media. As such, HAMR devices may include magnetic write heads for delivering electromagnetic energy to heat a small confined media area (spot size) at the same time the magnetic write head applies a magnetic field to the media for recording. According to various configurations, the methods and devices described herein may be applicable to other types of recording, e.g., perpendicular magnetic recording (PMR) and/or microwave-assisted magnetic recording (MAMR).

A HAMR read/write element, sometimes referred to as a slider, recording head, read head, write head, read/write head, etc., includes magnetic read and write transducers similar to those on current hard drives. For example, data may be read by a magnetoresistive sensor that detects magnetic fluctuations of a magnetic media as it moves underneath the sensor. Data is written to the magnetic media by a write coil that is magnetically coupled to a write pole. The write pole changes magnetic orientation in regions of the media as it moves underneath the write pole in response to an energizing current applied to the write coil. A HAMR slider will also generally include a source of energy, such as a laser diode, to heat the media while it is being written to by the write pole. An optical delivery path is integrated into the HAMR slider to deliver the energy to the surface of the media.

The optical delivery path of a HAMR slider may include a plasmonic transducer proximate a media-facing surface (e.g., air-bearing surface, contact surface). The plasmonic transducer shapes and transmits the energy to a small region on the medium. The plasmonic transducer is sometimes referred to as a near-field transducer (NFT), optical antenna, surface plasmon resonator, etc., and may include a plasmonic metal such as gold, silver, copper, aluminum, etc., and alloys thereof. The plasmonic transducer for a HAMR device creates a localized region of high power density in the media through an electromagnetic interaction. This results in a high temperature rise in a small region on the media, with the region exceeding the Curie temperature having dimensions less than 100 nm.

Generally, HAMR recording heads may utilize heaters for fine control of head-to media spacing. The heaters heat a portion of the recording head that faces the recording medium. The heating causes a local protrusion due to thermal expansion of the material. Thermal protrusion can be finely controlled to maintain a desired clearance between read/write transducers and the recording medium.

Figure 1:
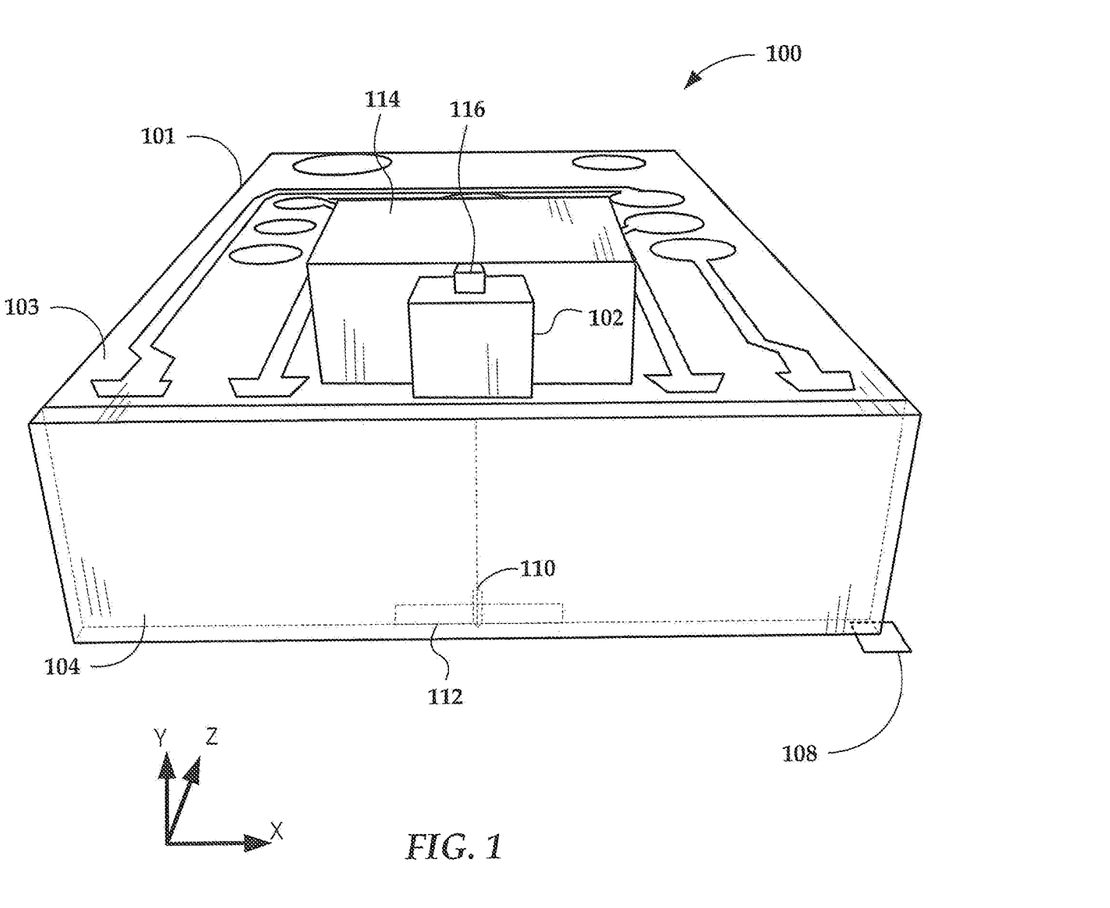
FIGS. 1 and 2 are views of a heat-assisted magnetic recording slider assembly according to example embodiments.

In reference to FIG. 1, a perspective view shows a HAMR read/write head 100 according to an example embodiment. The read/write head 100 includes a laser diode 102 located on input surface 103 of a slider body 101. In this example, the input surface 103 is a top surface, which is located opposite to a media-facing surface 108 that is positioned over a surface of a recording media (not shown) during device operation. The media-facing surface 108 is held proximate to the moving media surface while reading and writing data. The media-facing surface 108 may be configured as an air-bearing surface that maintains separation from the media surface via a thin layer of gas, typically air or helium.

The laser diode 102 delivers light to a region within a HAMR read/write head (not shown), which is located near the media-facing surface 108. The energy is used to heat the recording media as it passes by the read/write head. Optical coupling components, such as a waveguide 110, are formed integrally within the slider body 101 (near a trailing edge surface 104, in this example) and function as an optical path that delivers energy from the laser diode 102 to the recording media via a near-field transducer 112. The near-field transducer 112 is located within the read/write head and concentrates the optical energy to a sub-wavelength spot on the recording head, causing local heating of the media during recording operations.

The laser diode 102 in this example is shown as coupled to the slider body 101 via a submount 114. The submount 114 can be used to orient and affix an edge-emitting laser so that its output is directly downwards (negative y-direction in the figure). An input surface of the slider body 101 may include a grating or other coupling features to receive light from the laser via the optic fiber and/or waveguide. The read/write head 100 may also include an optical energy measurement sensor, such as photodetector 116 (e.g., a photodiode or bolometer). The photodetector 116 is configured to measure of intensity the laser light output.

Figure 2:
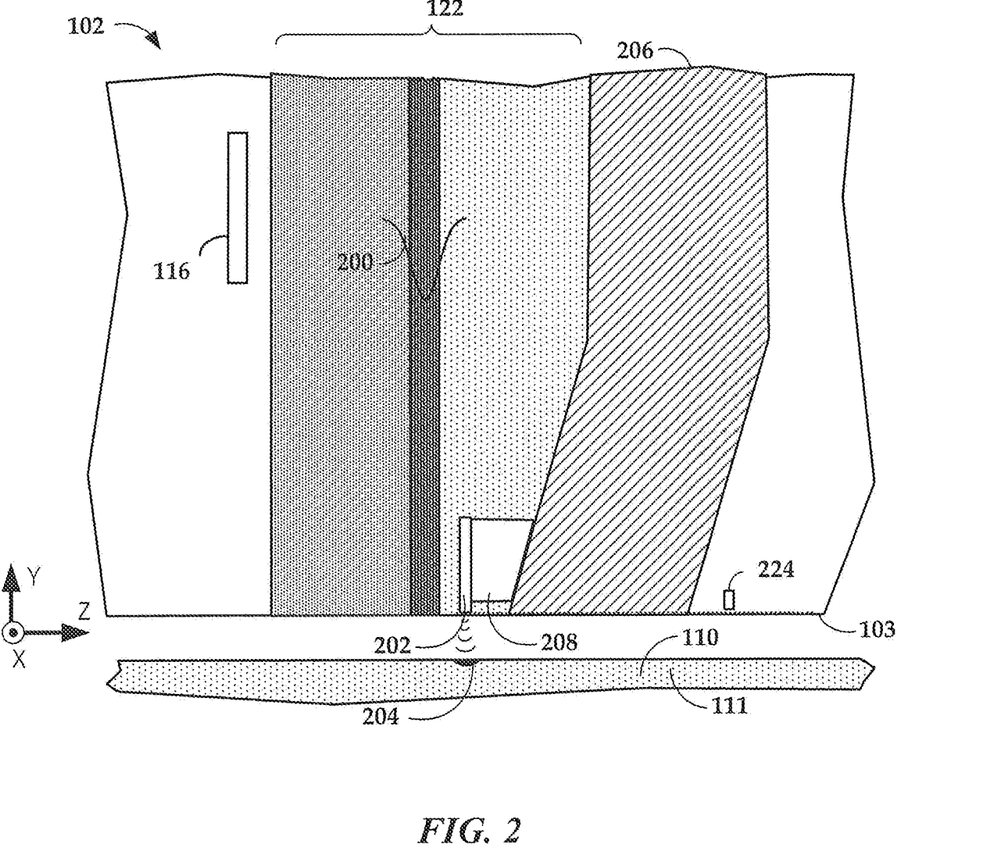

In FIG. 2, a block diagram illustrates a cross-sectional view of the slider 102 according to a representative embodiment. The waveguide 122 receives electromagnetic energy 200 from the energy source, the energy being coupled to the NFT 202. The NFT 202 is made of a metal (e.g., gold, silver, copper, etc.) that achieves surface plasmonic resonance in response to the applied energy 200. The NFT 202 shapes and transmits the energy to create a small hotspot 204 on the surface 110 of medium 111. A magnetic write pole 206 causes changes in magnetic flux near the media-facing surface 103 in response to an applied current. Flux from the write pole 206 changes a magnetic orientation of the hotspot 204 as it moves past the write pole 206 in the downtrack direction (z-direction).

The elevated temperatures associated with HAMR device operation results in thermochemical reactions between the slider 102 and the magnetic medium 111. For example, elevated temperatures at the head-disk interface result in an increase of contaminants from a variety of sources, including the lubrication that coats the magnetic medium 118. Globules of lubrication and other contaminants can form at the head-disk interface, which tend to accumulate at or near locations of elevated temperature. Other contaminants that tend to accumulate at the head-disk interface include silica, iron, iron-platinum, nickel, asperities, and other materials that are used to fabricate the magnetic medium. Dust and other ambient debris can also accumulate at the head-disk interface.

The slider 102 additionally includes the heating element (heater) 116 that may be used to adjust the protrusion of the write pole 206/NFT 202, a read transducer (not shown) and a sensor 224. A writer heater may be situated proximate a writer of the slider 102, and a reader heater may be situated proximate a reader of the slider 102. The sensor 224 may be used for various purposes, such as head-to-medium spacing measurements and contact detection. According to various configurations, the sensor 224 is configured to measure a change in resistance between the slider 102 and the magnetic medium 111. The sensor 224 may be a temperature coefficient of resistance (TCR) type sensor, for example, a dual-ended TCR (DETCR). While FIG. 2 shows a single sensor, it is to be understood that the slider may include multiple sensors, and/or a sensor in a different location than what is depicted. The slider 102 further includes a heat sink 208 that is thermally coupled to the NFT 202. The heat sink 208 may be used to draw heat away, e.g., to the write pole 206 or other nearby heat-conductive components, as the heat at the hotspot 204 increases.

Figure 3A:
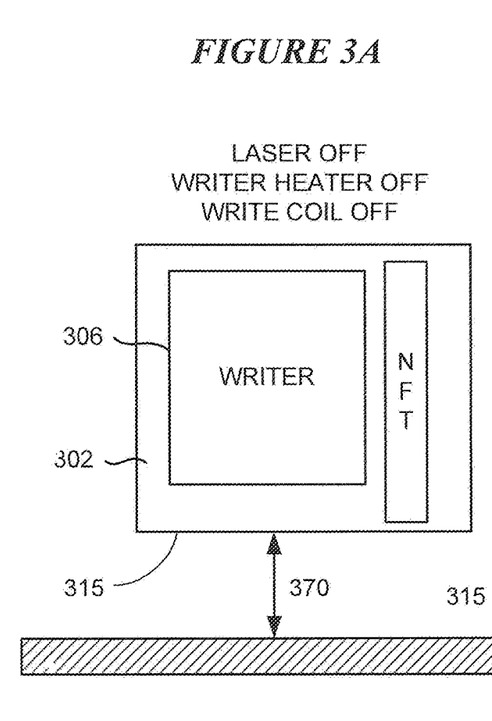
FIGS. 3A-3C are simplified side views of a writer portion of the slider 302 illustrated in FIGS. 1 and 2 in accordance with embodiments described herein.
Figure 3B:
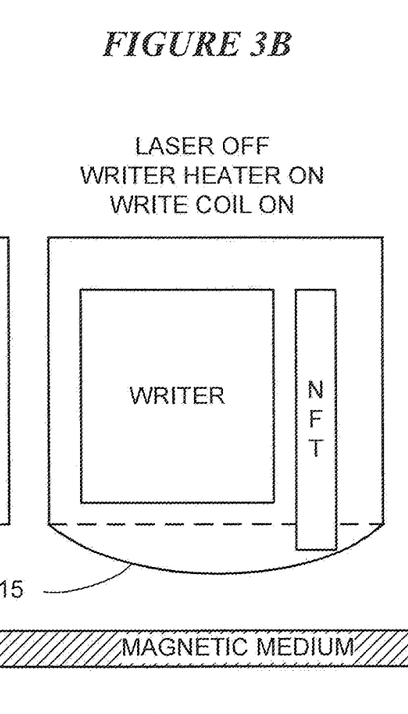
Figure 3C:
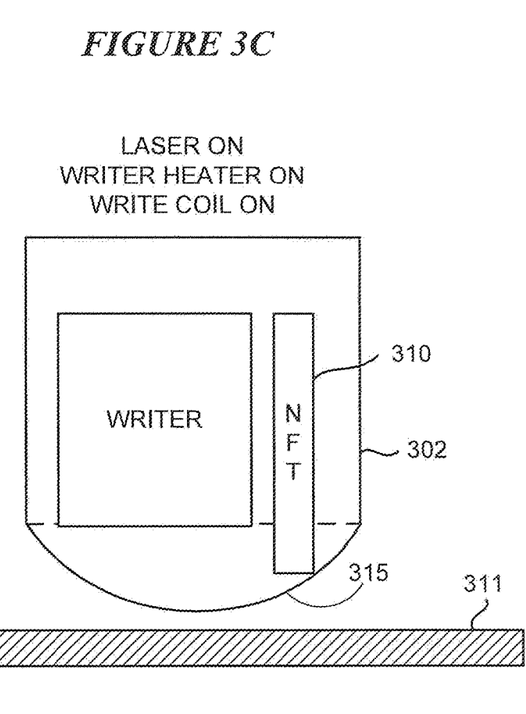

FIGS. 3A-3C are simplified side views of a writer portion of the slider 302 illustrated in FIGS. 1 and 2. FIGS. 3A-3C show general protrusion progression of a portion of the slider ABS 315 in response to activation of different heat sources within the slider 302. These different heat sources include the write coil of the writer 306, the writer heater 307 (not shown for simplicity), and the laser 320 (not shown for simplicity) which produces the optical energy converted to heat by the NFT 310.

In FIG. 3A, the slider 302 is shown in a non-thermally actuated state. In this state, the laser 320, writer heater 307, and writer coil 306 are all off. Thus, the slider 302 attains a default, non-actuated shape/state establishing a default distance between the ABS 315 of the slider 302 and the surface of the magnetic storage medium 311. This default distance is illustrated by an air gap 370.

FIG. 3B illustrates the slider 302 in a partial-thermally actuated state, which is not a typical operational state but is shown for illustrative purposes. In this state, the writer heater 307 and the writer coil 306 are on, but the laser 320 is off. In response to activation of the writer heat sources (write pole, return pole) and writer heater 307, the ABS 315 at and surrounding the writer portion of the slider 302 protrudes into the air gap 370. Thus, the air gap 370 and the distance between ABS 315 and the medium surface 311 decreases. The dashed line in FIG. 3B indicates the default state/shape of ABS 315 depicted in FIG. 3A.

The magnitude of ABS protrusion of the slider 302 is further increased by the additional activation of the laser 320, as shown in FIG. 3C. The additional heat produced by the NFT 310 in response to the incident laser light further expands the ABS 315, causing the ABS 315 to protrude further into air gap 370. It can be seen in FIGS. 3A-3C that the stroke, or magnitude, of the air bearing surface protrusion along the cross track direction (z-axis) of the slider 302 changes in size and shape with introduction and removal of heat to/from the ABS 315.

In HAMR drives, lube and/or other deposition may be found on at least a portion of the media. The lube and/or other deposition may also be referred to as contaminants herein. The location of where potential contaminants may be found on the media may be due to temperature differences at different times during the writing process. For example, contaminants may build up on the head over time and may be transferred to the media due to condensation and/or other processes. When a contaminant is present in servo regions of the media, this may interfere with accurate positioning of the head.

Contamination on the media-facing surface can have an effect on the temperature readings due to changes in heat transfer from the surface. For example, if the contaminant is a thermal insulator, higher than normal temperatures may result at the media-facing surface due to a decrease in heat transfer to the medium. This may result in the protrusion being greater than normal for a given heater power. The reverse effect may be seen if the contaminant is a thermal conductor, or otherwise decreases thermal resistance (e.g., increases surface area for convective heat transfer).

These changes in protrusion region response due to contamination can be used to take remedial action such as cleaning the recording head. According to various implementations, a recording head cleaning operation involves moving the head to a particular location on the media. This movement may include full stroke seeks or brief hard contact with the media. The contact would generally occur in a region where no data is stored, e.g., a region reserved for parking the recording head during idle or shutdown. In order to make contact with the media using contact, heat is applied to the slider to increase the protrusion using one or more heaters. In some cases, a protrusion in a particular location of the detected contaminant is increased. A thickness of the contaminant may be measured to determine how much power should be supplied to one or more heaters of the slider. A greater amount of power supplied to the one or more heaters translates to a greater amount of force between the slider and the media during the cleaning process.

Figure 4A:
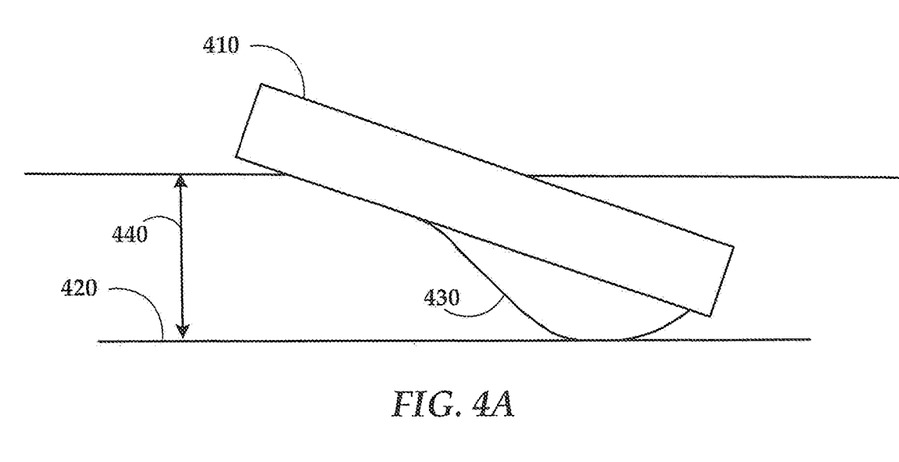
FIG. 4A illustrates contact between a medium and a slider without contaminants according to embodiments described herein.
Figure 4B:
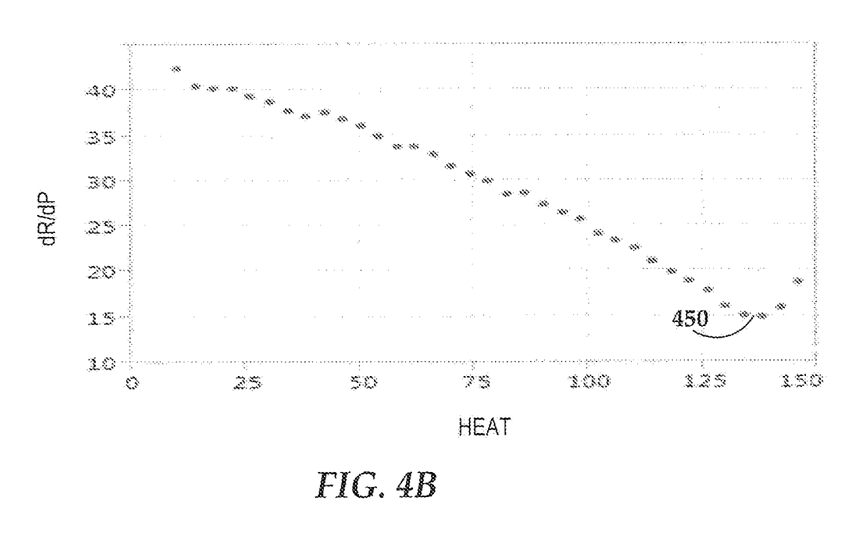
FIG. 4B illustrates dR/dP versus the heat applied to the slider for a slider without contaminants according to embodiments described herein.

The thickness of the contaminant may be measured the change in resistance over heater power, or dR/dP. The value dR/dP decreases substantially linearly until a minimum at head-media contact and increases again after head-media contact due to frictional heating. FIG. 4A illustrates contact between a medium 420 and a slider 410 without contaminants. The slider 410 has a protrusion 430 that protrudes from the slider 410 and makes contact with the medium 420. The passive fly height 440 is the fly height between the slider 410 and the medium 420 without any protrusion. FIG. 4B illustrates dR/dP versus the heat applied to the slider for a slider without contaminants. At the contact point 450 between the slider and the medium, dR/dP is about 15 Ohms/DAC at a heat of about 140 DACs.

Figure 5A:
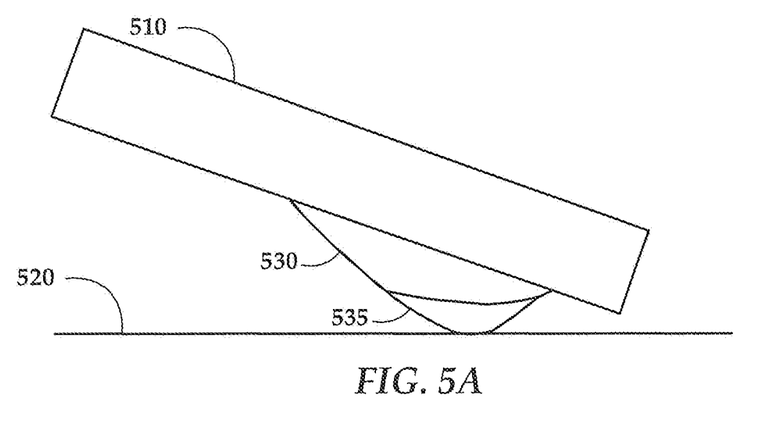
FIG. 5A illustrates contact between a medium and a slider with contaminants according to embodiments described herein.
Figure 5B:
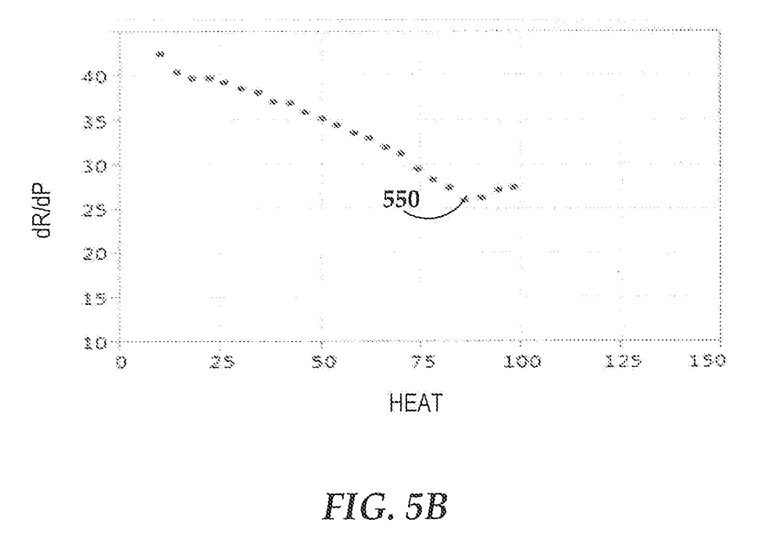
FIG. 5B illustrates dR/dP versus the heat applied to the slider for a slider with contaminants according to embodiments described herein.

FIG. 5A illustrates contact between a medium 520 and a slider 510 with contaminants. The slider 510 has a protrusion 530 that protrudes from the slider 510. Contamination 535 is present on the slider and causes the slider 510 to make contact with the medium 520 at less heat than in the example with no contamination shown in FIGS. 4A and 4B. FIG. 5B illustrates dR/dP versus the heat applied to the slider for a slider with contaminants. At the contact point 550 between the slider and the medium, dR/dP is about 25 Ohms/DAC at a heat of about 85 DACs.

Figure 6A:
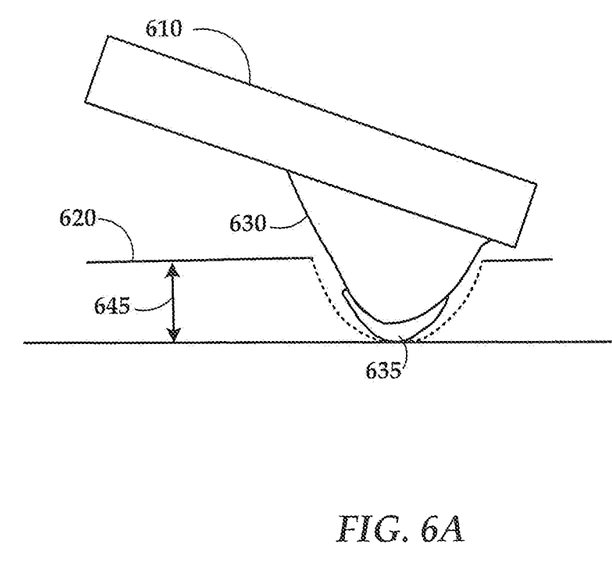
FIG. 6A illustrates contact between a medium during a cleaning operation according to embodiments described herein.

As described previously, the system can attempt to remove the contamination by making a hard contact with the media. The amount of heat that is used to remove the contamination may be higher than the heat used to simply make contact with the media. FIG. 6A illustrates contact between a medium 620 and a slider 610 in an attempt to remove the contamination 635 from the slider. The slider 610 has a protrusion 630 that protrudes from the slider 610. Heat beyond the heat needed for contact "cleanup heat" 645 may cause the slider to make contact with the media at a greater force in an attempt to remove the contamination.

Figure 6B:
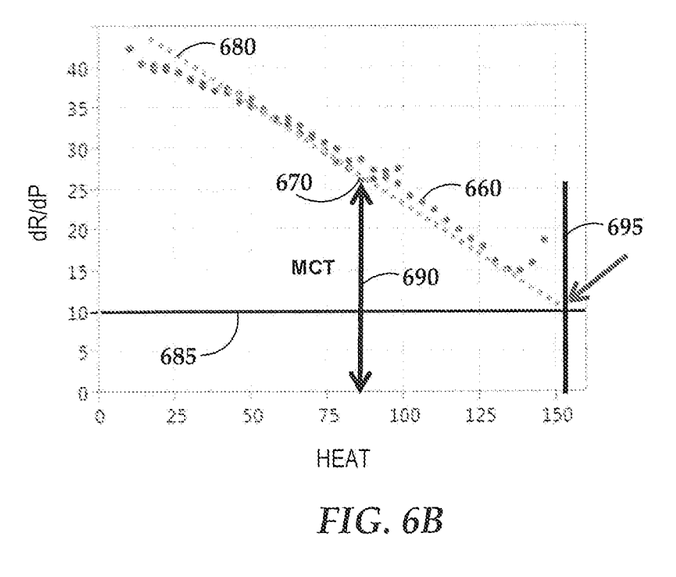
FIG. 6B illustrates an overlay of dR/dP versus the heat applied to the slider for a slider without contaminants and with contaminants according to embodiments described herein.

FIG. 6B illustrates an overlay of dR/dP versus the heat applied to the slider for a slider without contaminants 660 and with contaminants 670. The contamination thickness 690 is measured by determining dR/dP at contact of the slider with the media. The dR/dP representative of the target contamination thickness is represented by TCT 685. The projected contact heat needed to get to the target thickness is represented by PCH 695. The adaptive cleanup heat used to attempt to remove the contaminant is represented by Equation 1 where ACUH is the adaptive cleanup heat, MCT is the measured contamination thickness, TCT is the target contamination thickness, and MACUH is the maximum allowed adaptive cleanup heat. The measurement and cleanup process may be repeated until the measured thickness is at or below the TCT.

$$ACUH = (MCT - TCT)/TCT * MACUH \quad \text{Equation 1}$$

MACUH is a predetermined value that reflects the maximum cleaning strength. MCH is the maximum heat allowed. In some cases, MCH is about 250 mW. According to various configurations, PCH is the projected contact heat and is determined based on a linear relationship between the contamination thickness and the heat needed for that particular contamination thickness to make contact with the media. The linear relationship is illustrated by line 680 in FIG. 6B.

The total clean up heat, TCUH, is calculated by using Equation 2. TCUH is the total heat that is applied to the slider during the cleanup process.

$$TCUH = PCH + ACUH < MCH \quad \text{Equation 2}$$

Figure 7:
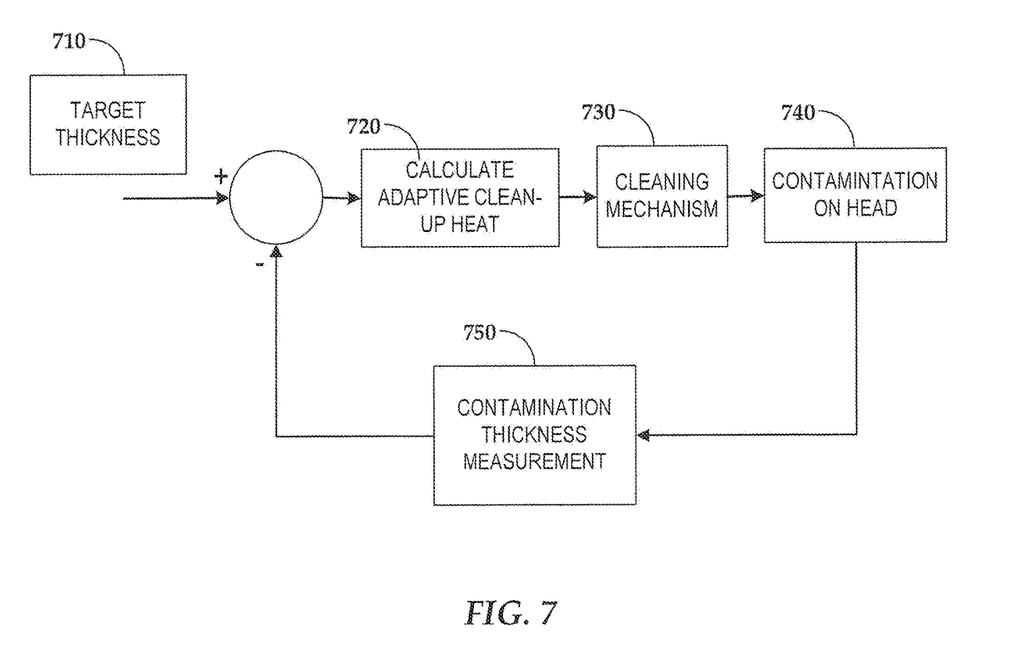
FIG. 7 illustrates the measurement and cleaning process in accordance with various embodiments described herein.

FIG. 7 illustrates the measurement and cleanup process in accordance with various embodiments described herein. A closed loop feedback system is used to clean the slider. According to various configurations, the process shown in FIG. 7 may be implemented by a controller coupled to a memory. Contamination is detected 740 on the slider. The thickness of the contamination is measured 750. A target thickness value 710 may be stored in the memory for use by the controller to implement the adaptive cleaning process. In some cases, the target thickness value is set in the factory and is not changed throughout the lifetime of the device. In some embodiments the target thickness may be changed from an initial default value to other values during the lifetime of the device. The target thickness value 710 and the measured contamination thickness 750 are used to calculate ACUH 720. The slider is cleaned 730 using the calculated ACUH. Again, it is determined 740 whether contamination is present on the slider and the contamination thickness is measured 750. The process is then repeated until the measured contamination thickness is at or below the target thickness. In some cases, the process may stop before the target thickness is reached. For example, if a projected contact heat between two successive measurements is less than a predetermined threshold, the process may stop.

Figure 8:
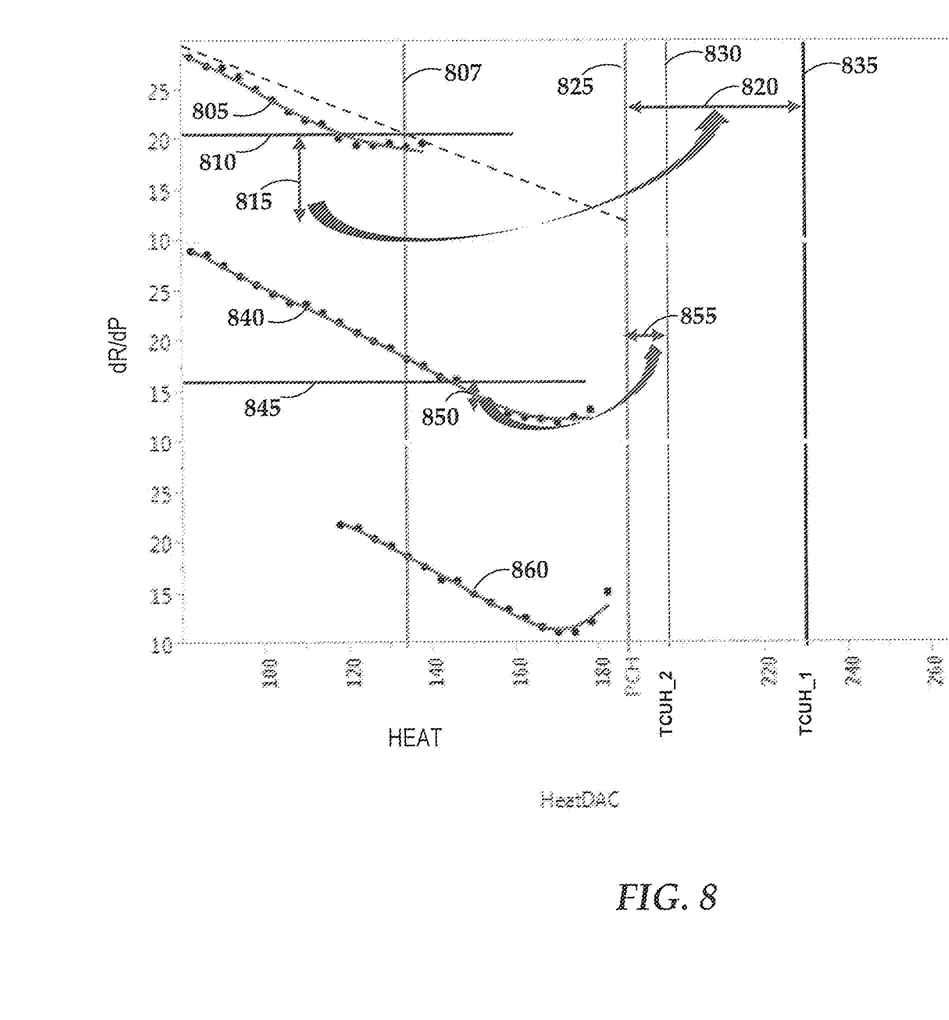
FIG. 8 shows an example of an adaptive cleaning process in accordance with embodiments described herein.

FIG. 8 shows an example of an adaptive cleanup process in accordance with embodiments described herein. The target contamination thickness is set at 10. In the first measurement 805, the contact heat 807 is about 134 and a measured contamination thickness is about 19.3. A projected contact heat, PCH, is set at 187 for the target thickness. The total cleanup heat is calculated using Equations 1 and 2. In this case, TCUH is calculated to be about 236.29. A cleanup process is performed using the calculated TCUH. A second measurement process 840 results in the contact heat being about 170 and the measured contamination thickness is now about 11.87. A second TCUH value is calculated using the contact heat and the measured contamination thickness to be about 197. A second cleanup process is conducted using the second TCUH value. A third measurement process 860 results in the contact heat being about 170. In this case, a difference between the third contact heat value and the second contact heat value is less than a convergence threshold of 5 and therefore, the process stops even though the measured contamination thickness is not yet at or below the TCT.

Figure 9:
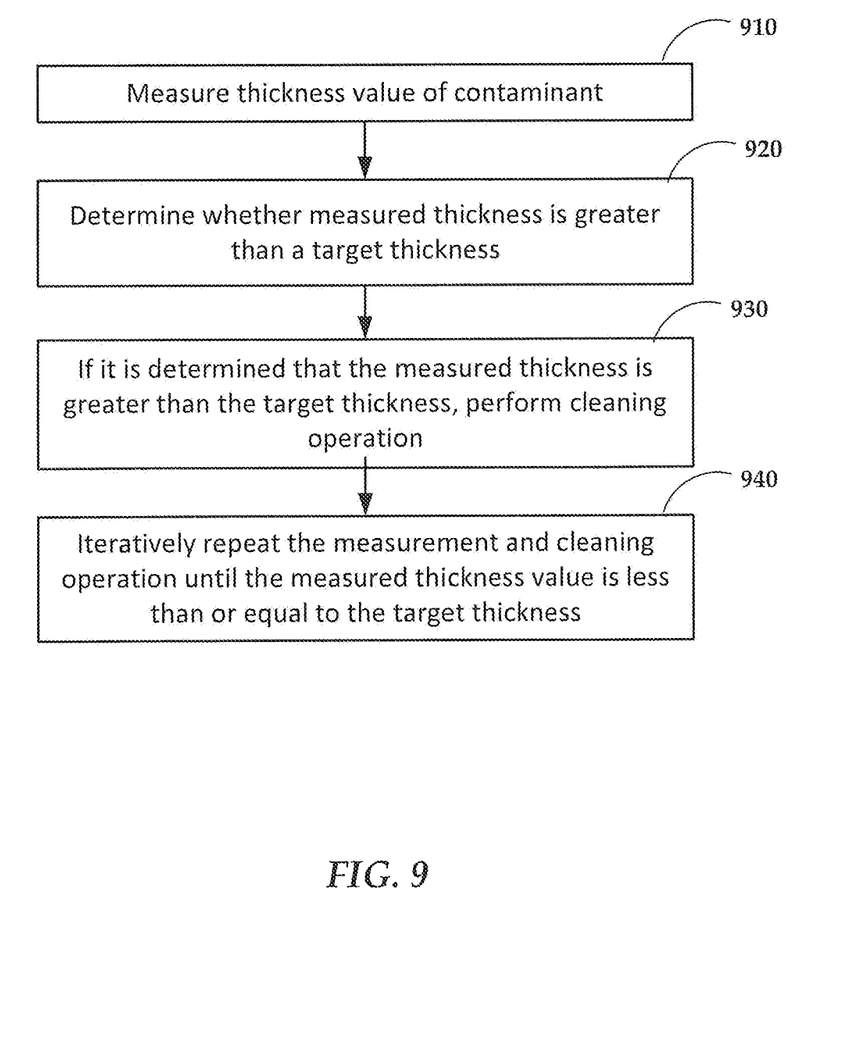
FIG. 9 illustrates a process for implementing an adaptive cleaning process in accordance with embodiments described herein.

FIG. 9 shows a process for implementing an adaptive cleaning process in accordance with embodiments described herein. A thickness value of a contaminant on a slider is measured 910. The thickness value may be measured based on a dR/dP value. It is determined 920 whether the measured thickness value is greater than a target thickness. If it is determined that the thickness is greater than the target thickness, the slider is cleaned 930 based on the measured thickness value. For example, the slider may be cleaned using a heat that is based on the measured thickness. In some cases, less heat is used to clean a lower measured thickness compared to a higher measured thickness due to the closer spacing between the slider and the media. The thickness measurement 910, and subsequent cleaning 930 if it is determined 920 that the measured thickness is greater than the threshold is iteratively repeated 940 until it is determined 920 that the thickness value is less than or equal to the target thickness. According to various configurations described herein, the adaptive cleaning process described herein does not result in burnishing of the head.

Figure 10A:
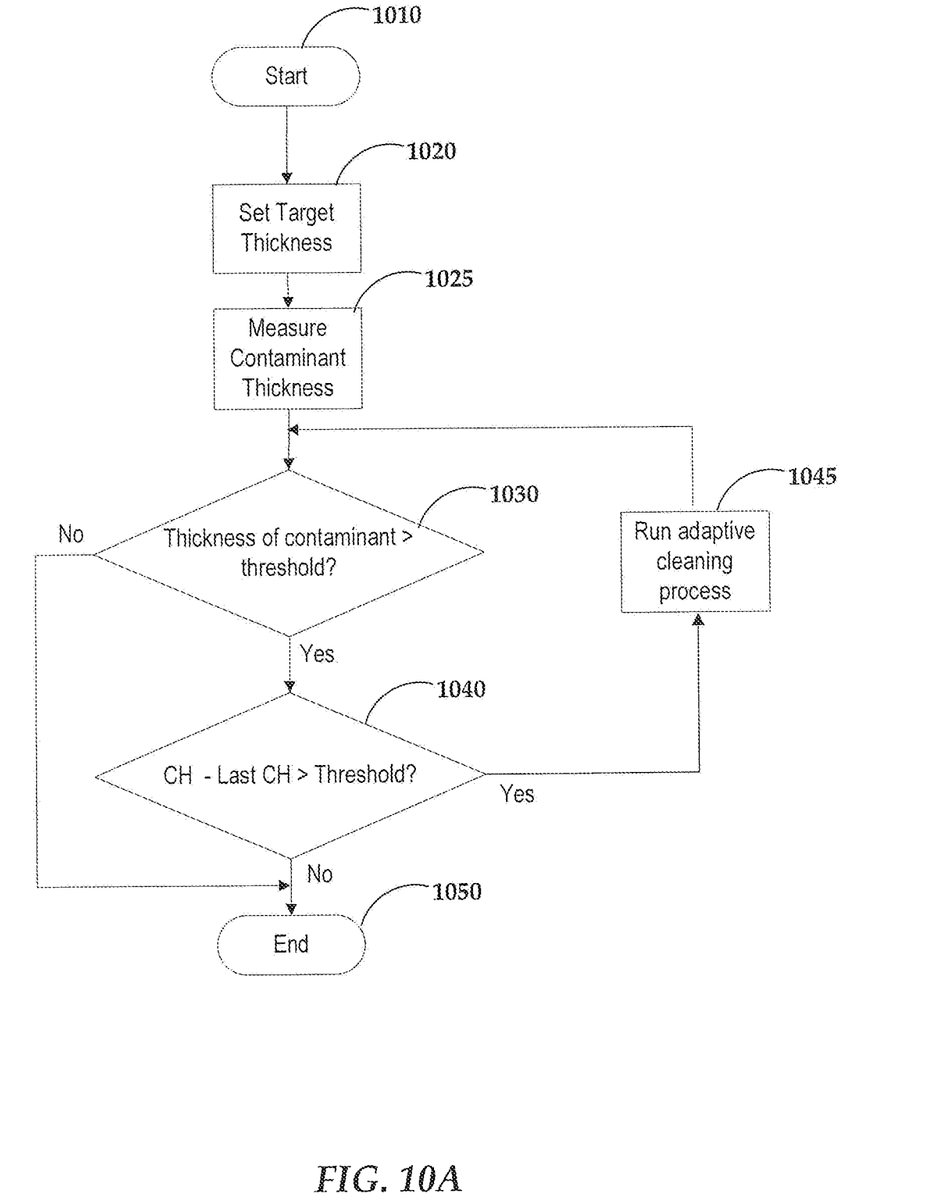
FIGS. 10A and 10B illustrate a more detailed process for implementing an adaptive cleaning process in accordance with embodiments described herein.
Figure 10B:
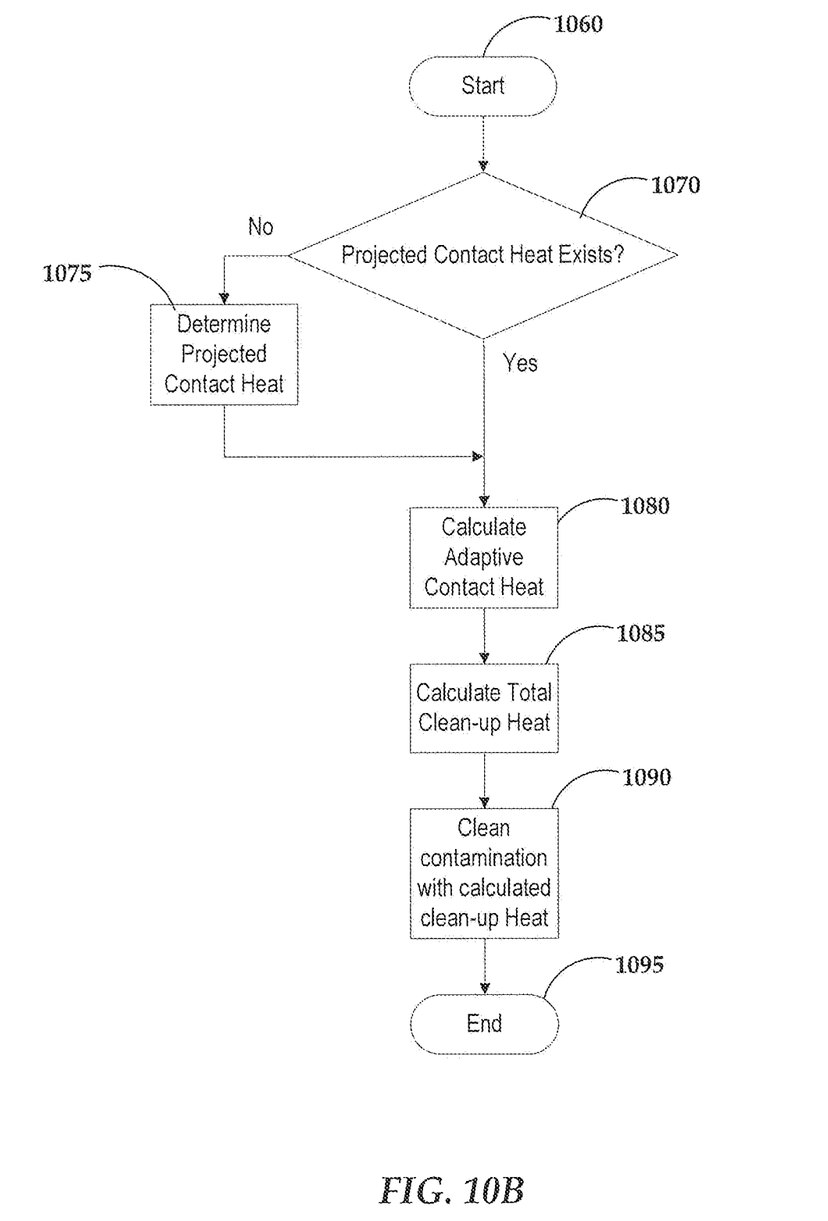

FIGS. 10A and 10B illustrate a more detailed process for implementing an adaptive cleaning process in accordance with embodiments described herein. The process starts 1010 and a target thickness is set 1020. According to various configurations, the target thickness is a predetermined value stored in memory. In some cases, the target thickness value is changed from the initial predetermined value to a different value. The target thickness may be changed based on the life of the hard drive. For example, the target thickness may be greater for an older drive than for a comparatively younger drive. In some cases, the target thickness is set in the factory and is not changed from the initial value. A thickness of a contaminant is measured 1025. This may be done by a process that determines an amount of heater power that it takes for the head to make contact with the media using a DETCR sensor, for example. In general, a smaller amount of heater power needed translates to a higher contaminant thickness value. In some cases, the contaminant thickness is measured by determining a dR/dP value between the head and the media.

It is determined 1030 whether the contaminant thickness is greater than the target thickness. If it is determined 1030 that the thickness of the contaminant is not greater than the target thickness, the process ends 1050. If it is determined 1030 that the contaminant thickness is greater than the threshold, it is determined 1040 whether the contact heat minus the last contact heat is greater than a predetermined threshold. If it is determined 1040 that the contact heat minus the last contact heat is not greater than the threshold, the process ends 1050. If it is determined 1040 that the contact heat minus the last contact heat is greater than the threshold, an adaptive cleaning process is run 1045. After the adaptive cleaning process is run 1045. The it is determined 1030 whether the contaminant thickness is still greater than the target thickness. The process continues until the thickness of the contaminant is less than or equal to the target thickness and/or the contact heat minus the last contact heat is less than or equal to the predetermined threshold.

FIG. 10B illustrates the adaptive cleaning process in accordance with various embodiments described herein. The process starts 1060 and it is determined 1070 whether a projected contact heat exists for the measured contamination thickness. If it has been determined 1070 that a projected contact heat does not exist, the projected contact heat is determined 1075. After it has been determined 1070 that a projected contact heat exists or a projected contact heat is determined 1075, an adaptive contact heat is calculated 1080 for the measured contaminant thickness. A total cleanup heat is calculated 1085 by determining the sum of the adaptive cleanup heat and the projected contact heat. The contamination is cleaned 1090 using the total cleanup heat and the process ends 1095. The processes described herein may be implemented in the factory. For example, the adaptive cleanup process may be implemented before or during servo pattern writing. In some cases, the adaptive cleanup process is implemented in the field.

Figure 11:
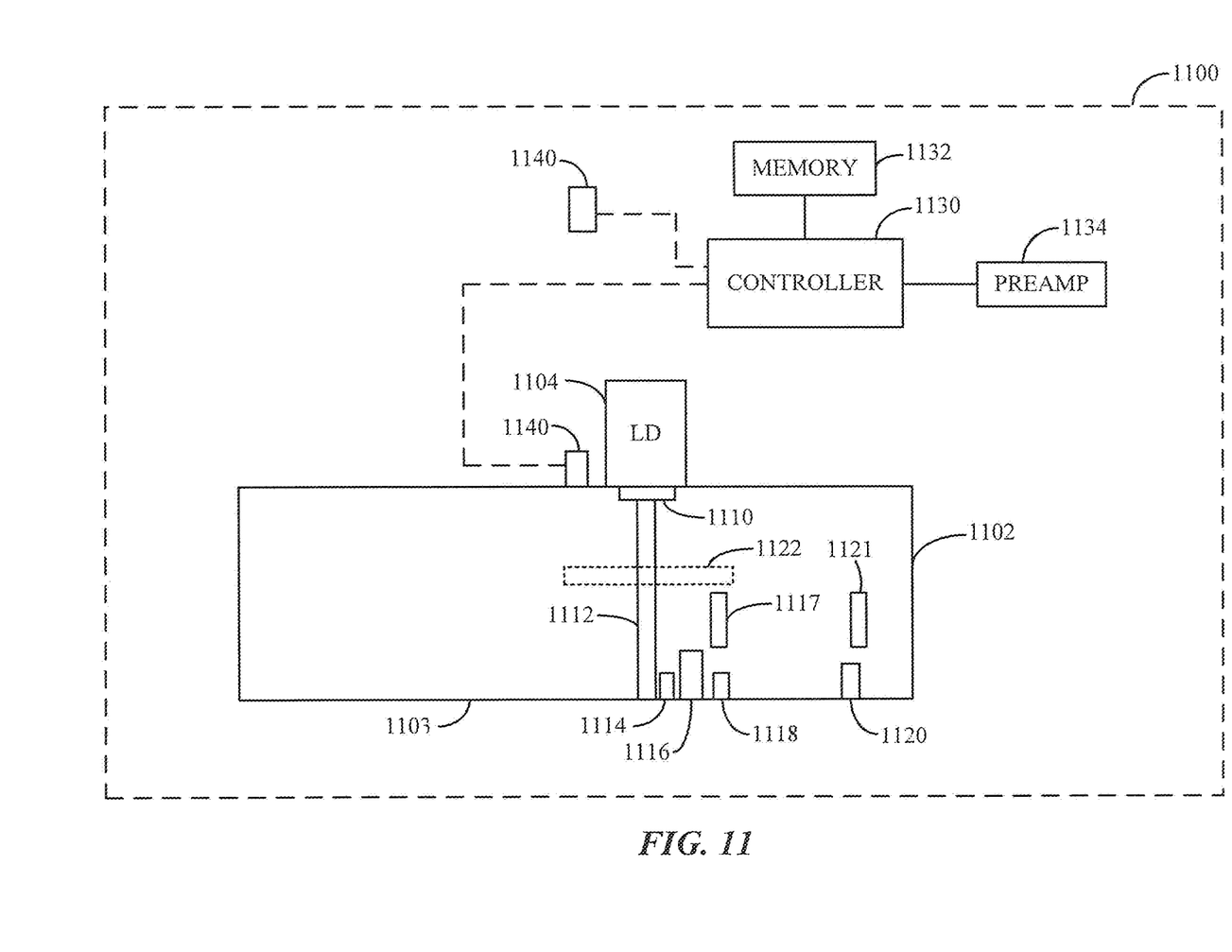
FIG. 11 is a block diagram of a system for implementing an adaptive cleaning process in accordance with various embodiments described herein.

FIG. 11 is a block diagram of a system for implementing an adaptive cleaning process in accordance with various embodiments. FIG. 11 shows a portion of a HAMR drive 1100 which includes a slider 1102 upon which a laser diode 1104 is mounted. The slider 1102 includes a number of components including an optical waveguide 1112 which is optically coupled to the laser diode 1104 via an optical coupler 1110. The optical waveguide 1112 extends from the optical coupler 1110 to an NFT 1114 situated at the air bearing surface 1103 proximate the optical waveguide 1112. In some embodiments, a bolometer 1122 is situated proximate the optical waveguide 1112. A writer 1116 is situated proximate the NFT 1114. A writer heater 1117 is situated proximate the writer 1116 and configured to thermally actuate the writer 1116 (e.g., writer pole/NFT). A contact sensor 1118 may be situated proximate the writer 1116 and NFT 1114 (e.g., at a close point of the writer). A reader 1120 is shown positioned away from the writer 1116 and contact sensor 1118. A reader heater 1121 is positioned proximate the reader 1120 and configured to thermally actuate the reader 1120. A temperature sensor 1140 (e.g., a thermistor or thermocouple) is provided in the HAMR drive 1100 to measure an operating temperature of the drive 1100. In some embodiments, the temperature sensor 1140 is positioned close to the laser diode 1104 or the slider 1102. In other embodiments, the temperature sensor 1140 is positioned away from the slider 1102 but within the enclosure of the drive 1100.

The HAMR drive 1100 further includes a controller 1130 (e.g., microprocessor or microcontroller) coupled to a non-volatile memory 1132. A target contamination thickness can be stored in the memory 1132. The controller is also coupled to a preamplifier 1134. Preamplifier 1134 is configured to control the heaters 1117, 1121 and to facilitate the measurement of the change in resistance between the slider and the medium. The controller 1130 is configured to implement the processes described above For example, the controller 1130 is configured to implement executable instructions corresponding to the flow charts and other figures discussed hereinabove.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality. Various modifications and additions can be made to the disclosed embodiments discussed above. Accordingly, the scope of the present disclosure should not be limited by the particular embodiments described above, but should be defined only by the claims set forth below and equivalents thereof.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

The invention claimed is:

1. A method comprising:
  performing a cleaning process, comprising:
    measuring a thickness value of a contaminant on a slider;
    determining whether the thickness value is greater than a target thickness;
    if it is determined that the thickness is greater than the target thickness, cleaning the slider based on the measured thickness value; and
  iteratively repeating the cleaning process until the thickness value is less than or equal to the target thickness.

2. The method of claim 1, wherein cleaning the slider comprises making contact or near-contact between the slider and a medium.

3. The method of claim 2, further comprising, supplying heat to the slider to make the contact with the medium.

4. The method of claim 1, wherein a heat amount used for the cleaning process is based on the measured thickness value.

5. The method of claim 1, further comprising,
  determining whether a current contact heat minus a previously measured contact heat is less than a predetermined threshold; and
  if it is determined that the current contact heat minus the previously measured contact heat is less than the predetermined threshold, stopping the cleaning process.

6. The method of claim 5, wherein the previously measured contact heat is an immediately previously measured contact heat.

7. The method of claim 1, wherein cleaning the slider comprises:
  determining a projected contact heat for the measured thickness value; and
  cleaning the slider using the projected contact heat.

8. The method of claim 1, wherein measuring the thickness value comprises measuring the thickness value by determining a ratio of a change in resistance to a change in heater power.

9. The method of claim 1, wherein the slider is a slider of at least one of a heat-assisted magnetic recording (HAMR) disk drive, a perpendicular magnetic recording (PMR) disk drive, and a microwave-assisted magnetic recording (MAMR) disk drive.

10. An apparatus, comprising:
  a slider of a magnetic recording disk drive movable relative to a magnetic recording medium;
  a controller of the disk drive coupled to the slider, the controller configured to:
  perform a cleaning process, comprising:
    measure a thickness value of a contaminant on the slider;
    determine whether the thickness value is greater than a target thickness;
    if it is determined that the thickness is greater than the target thickness, initiate a cleaning process based on the measured thickness value; and
  iteratively repeat the cleaning process until the thickness value is less than or equal to the target thickness.

11. The apparatus of claim 10, wherein the cleaning process comprises making contact between the slider and the medium.

12. The apparatus of claim 11, further comprising, at least one heater configured to supply heat to the slider to make the contact with the medium.

13. The apparatus of claim 10, wherein a heat amount used for the cleaning process is based on the measured thickness value.

14. The apparatus of claim 10, wherein the controller is further configured to:
  determine whether a current contact heat minus a previously measured contact heat is less than a predetermined threshold; and
  if it is determined that the current contact heat minus the previously measured contact heat is less than the predetermined threshold, stop the cleaning process.

15. The apparatus of claim 14, wherein the previously measured contact heat is an immediately previously measured contact heat.

16. The apparatus of claim 10, wherein the controller is further configured to
  determine a projected contact heat for the measured thickness value; and
  initiate the cleaning process using the projected contact heat.

17. The apparatus of claim 10, wherein the controller is configured to measure the thickness value by determining a ratio of a change in resistance to a change in heater power.

18. The apparatus of claim 10, wherein the slider is a slider of a heat-assisted magnetic recording (HAMR) disk drive, the slider comprising a writer, a reader, a near-field transducer, and an optical waveguide for communicating light from a laser diode to the near-field transducer.

19. The apparatus of claim 10, further comprising at least one thermal sensor.

20. The apparatus of claim 19, wherein the at least one thermal sensor is a dual-ended temperature coefficient of resistance (DETCR) sensor.

* * * * *